US00RE38093E

(19) United States
(12) Reissued Patent
Chiou

(10) Patent Number: US RE38,093 E
(45) Date of Reissued Patent: Apr. 29, 2003

(54) MASON'S HAND TOOL

(75) Inventor: Lian-Jen Chiou, Taichung Hsien (TW)

(73) Assignee: Ding Wei Enterprises, Inc., Taichung Hsien (TW)

(21) Appl. No.: 09/825,773

(22) Filed: Apr. 4, 2001

Related U.S. Patent Documents

Reissue of:
(64) Patent No.: 6,131,290
Issued: Oct. 17, 2000
Appl. No.: 09/280,705
Filed: Mar. 30, 1999

(51) Int. Cl.[7] ..... B26B 3/00
(52) U.S. Cl. ..... 30/169; 30/340; 16/436; 16/DIG. 19; 81/489; 81/492
(58) Field of Search ..... 30/169, 340, 342, 30/343, 344; 16/110.1, 111.1, 421, 436, DIG. 19; 15/143.1, 236.01, DIG. 10; 81/489, 492

(56) References Cited

U.S. PATENT DOCUMENTS

| | | | | | |
|---|---|---|---|---|---|
| 1,469,766 | A | | 10/1923 | Blair | |
| 1,529,683 | A | * | 3/1925 | Anderson | 30/169 |
| 2,091,458 | A | | 8/1937 | Sleight | |
| 2,328,366 | A | | 8/1943 | Timmerman | |
| 2,655,963 | A | | 10/1953 | Dell | |
| 3,562,826 | A | * | 2/1971 | Vaughn | 30/169 |
| 3,742,602 | A | * | 7/1973 | Brumwell | 30/340 |
| 4,197,611 | A | | 4/1980 | Bell et al. | |
| 4,335,509 | A | * | 6/1982 | Smith | 30/340 |
| 4,452,289 | A | | 6/1984 | Smith | |
| 4,739,536 | A | * | 4/1988 | Bandera et al. | 81/492 |
| 4,773,281 | A | | 9/1988 | Diloia | |
| 4,825,552 | A | * | 5/1989 | Bendickson et al. | 30/340 |
| 4,828,261 | A | | 5/1989 | Kleylein | |
| 4,893,519 | A | | 1/1990 | Corso et al. | |
| 4,941,232 | A | | 7/1990 | Decker et al. | |
| 4,974,286 | A | | 12/1990 | Stowell et al. | |
| D314,700 | S | | 2/1991 | Lurkis | |
| 5,052,253 | A | * | 10/1991 | Lin | 81/489 |
| RE34,194 | E | | 3/1993 | Stowell et al. | |
| 5,210,925 | A | * | 5/1993 | Morgulis | 30/340 |
| 5,497,551 | A | * | 3/1996 | Apprille, Jr. | 30/526 |
| 5,526,724 | A | * | 6/1996 | Bruggeman | 81/492 |
| 5,881,615 | A | * | 3/1999 | Dahl et al. | 16/110.5 |

FOREIGN PATENT DOCUMENTS

| | | |
|---|---|---|
| DE | 825778 | 12/1951 |
| DE | 2935806 | 1/1981 |
| GB | 422254 | 1/1935 |
| WO | WO 8602849 | 5/1986 |

* cited by examiner

*Primary Examiner*—Hwei-Siu Payer
(74) *Attorney, Agent, or Firm*—Alan Kamrath; Rider, Bennett, Egan & Arundel, LLP

(57) ABSTRACT

A mason's hand tool includes a blade, a handle, and a head cap. The blade is fastened with one end of the handle. The handle has a head end opposite to the one end of the handle. The head cap is fastened with the hand end. The handle and the head cap are made integrally of a plastic material by injection molding. The head cap has a plurality of protruding which are anchored in the head end of the handle.

11 Claims, 6 Drawing Sheets

MASON'S HAND TOOL

Matter enclosed in heavy brackets [ ] appears in the original patent but forms no part of this reissue specification; matter printed in italics indicates the additions made by reissue.

FIELD OF THE INVENTION

The present invention relates generally to a hand tool, and more particularly to a mason's hand tool.

BACKGROUND OF THE INVENTION

As shown in FIGS. 1 and 2, a mason's hand tool of the prior art comprises a blade 10['], a handle 20['], and a head cap *25*[30']. The handle 20['] is made of a plastic material and is devoid of a skidproof surface enabling the hand of a person to get a firm grip on the handle 20[']. The head cap *25*[30'] is fastened with the head end of the handle 20['] by rivet or adhesive and is therefore vulnerable to being detached from the head end of the handle 20['] especially at the time when the head cap *25*[30'] is used by a mason to hit a nail or screw that is not completely fastened onto something.

SUMMARY OF THE INVENTION

The primary objective of the present invention is therefore to provide an improved hand tool which is free from the drawbacks of the prior art hand tool described above.

In keeping with the principle of the present invention, the foregoing objective of the present invention is attained by a hand tool comprising a blade, a handle, and a head cap. The handle is provided with a skidproof surface to enable the hand of a person to get a firm grip on the handle. The handle and the head cap are made integrally of a rigid plastic material by injection molding.

The foregoing objective, features, functions, and advantages of the present invention will be more readily understood upon a thoughtful deliberation of the following detailed description of a preferred embodiment of the present invention with reference to the accompanying drawings.

DETAILED DESCRIPTION OF THE EMBODIMENT

Figure 1:
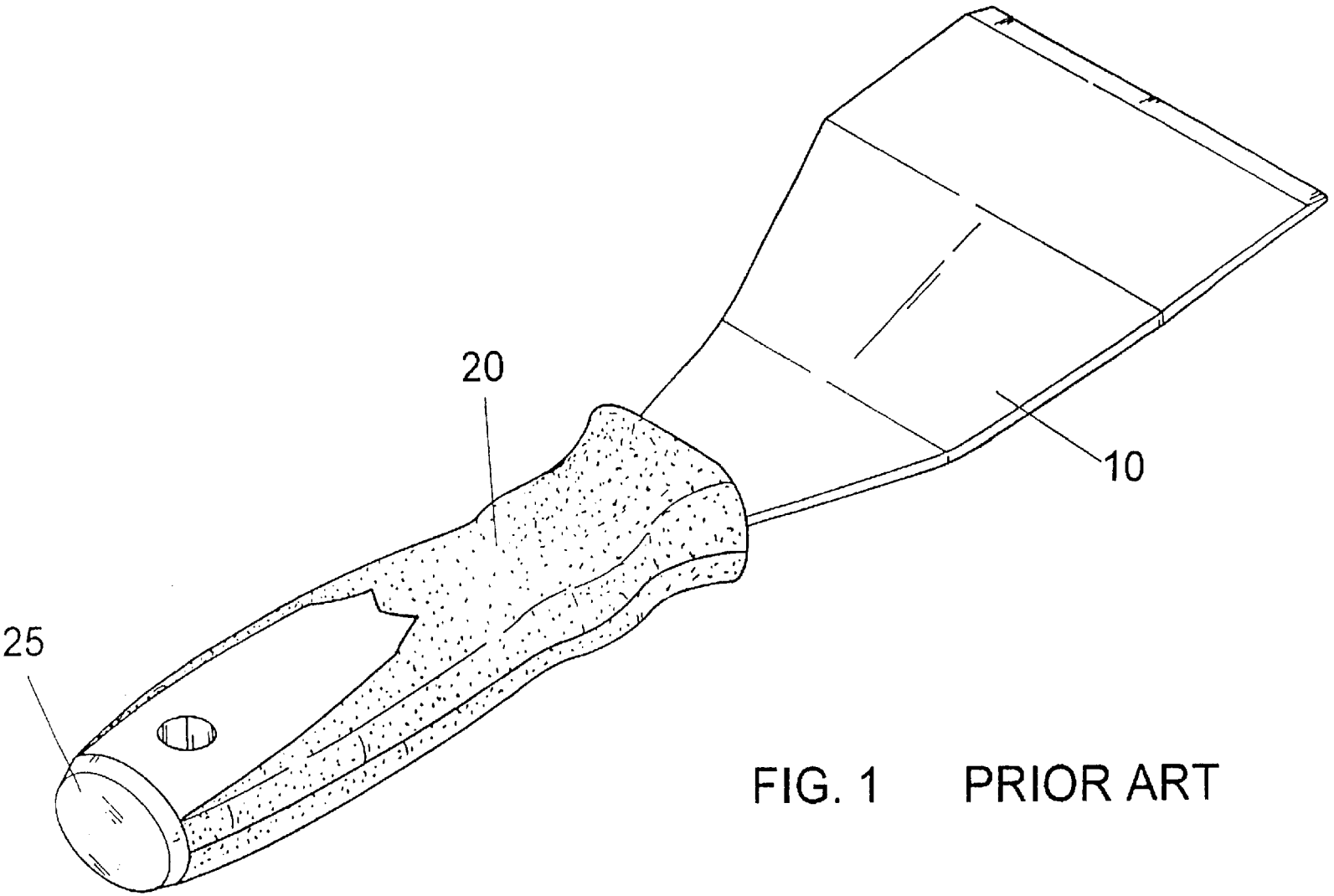
FIG. 1 PRIOR ART
FIG. 1 shows a perspective view of a hand tool of the prior art.
Figure 2:
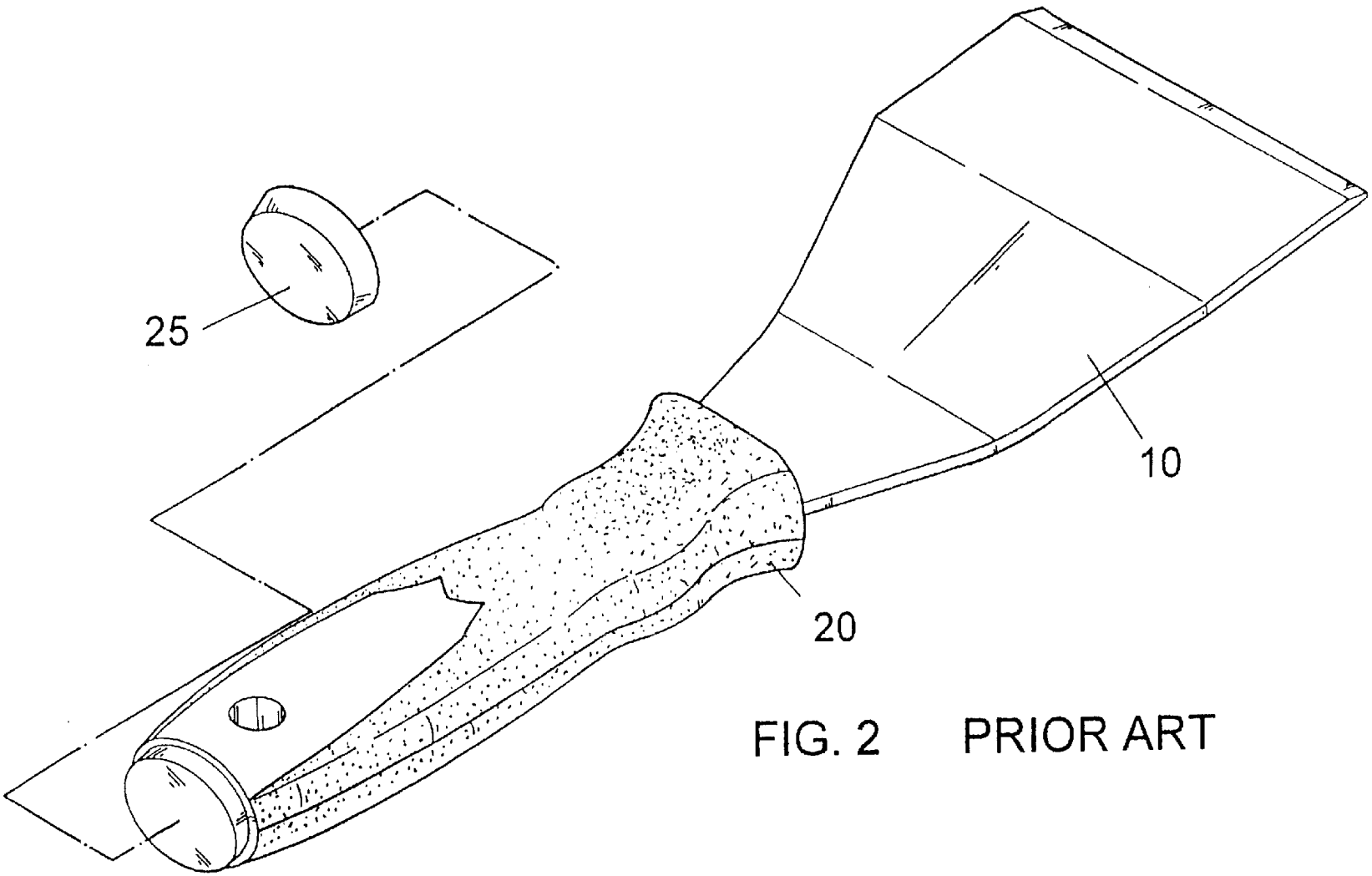
FIG. 2 PRIOR ART
FIG. 2 shows an exploded view of the hand tool of the prior art.
Figure 3:
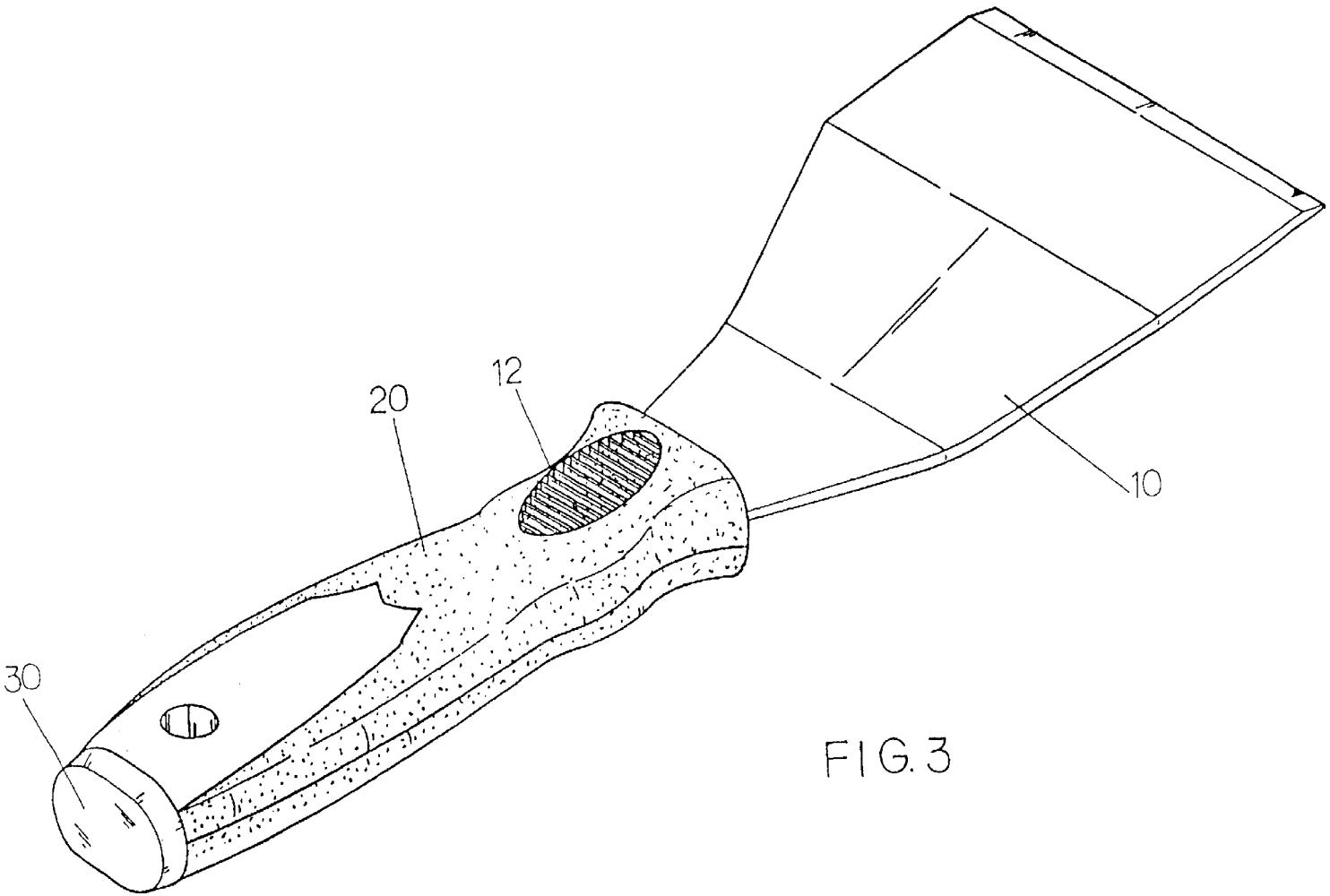
FIG. 3 shows a perspective view of a hand tool of the preferred embodiment of the present invention.

As shown in FIG. 3, a hand tool embodied in the present invention is composed of a blade 10, a handle 20, and a head cap 30.

The handle 20 is fastened at one end thereof with the blade 10 which is used in spreading cement mortar or things of that nature. The cap 30 is fastened with the head end of the handle 20. In the preferred embodiment of the present invention, the handle 20 and the head cap 30 are made integrally of a rigid plastic material by injection molding. The handle 20 is provided on the outer surface of the one end thereof with a skidproof area 12 providing friction to enable the thumb and the index finger to hold the skidproof area 12 securely.

Figure 5:
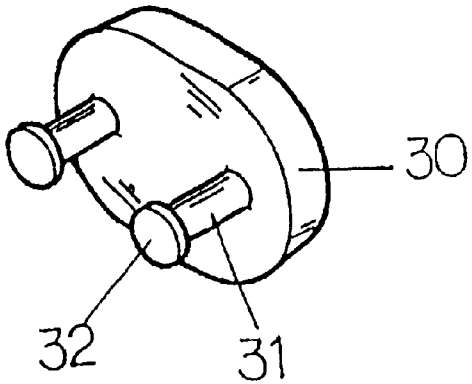
FIG. 5 shows a perspective view of another embodiment of a head cap of the hand tool of the present invention.
Figure 4:
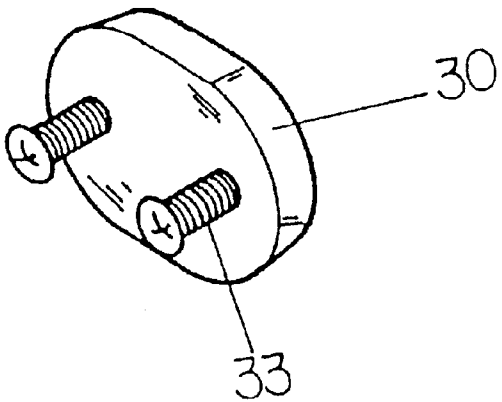
FIG. 4 shows a perspective view of an embodiment of a head cap of the hand tool of the present invention.
Figure 6:
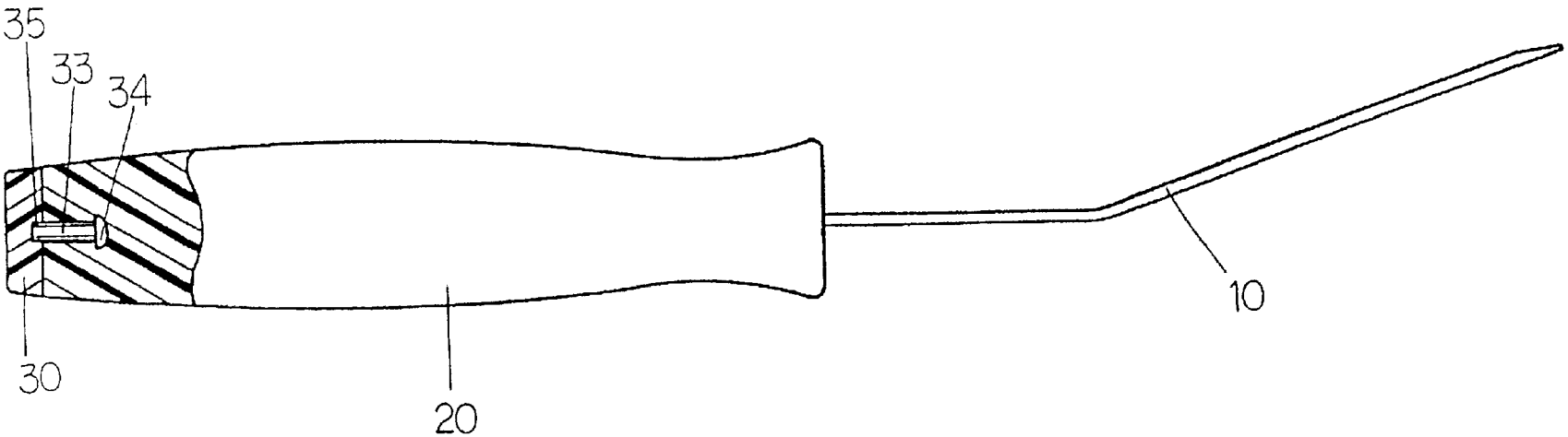
FIG. 6 shows a side view, partly sectioned, of the hand grip of the present invention having the head cap in FIG. 4.
Figure 7:
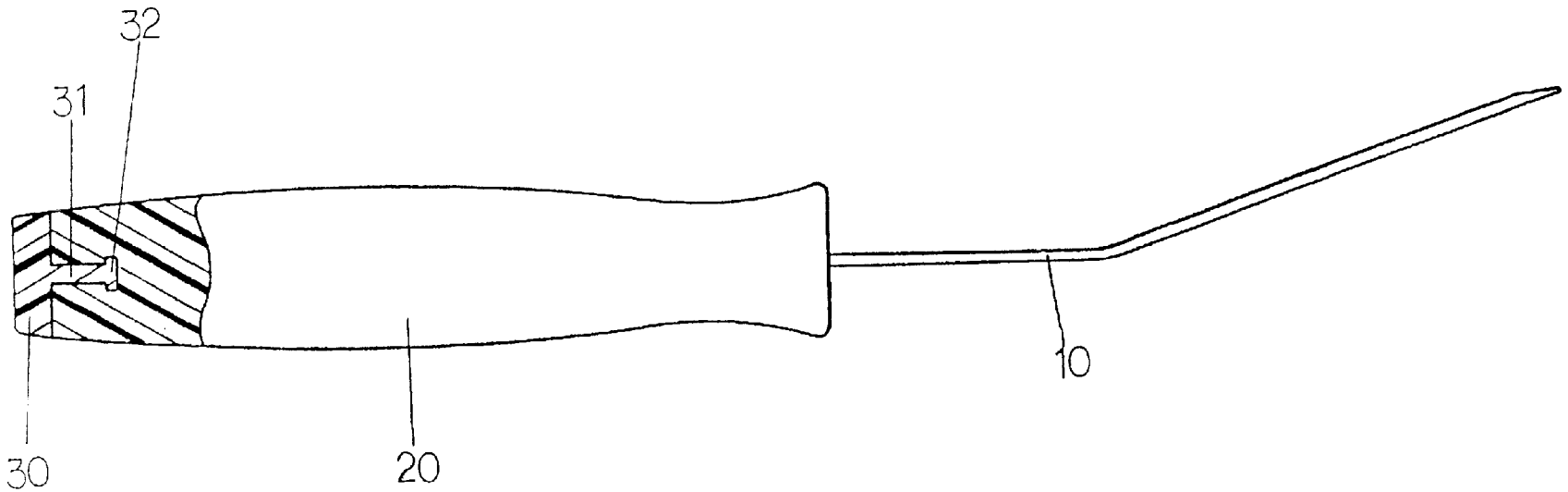
FIG. 7 shows a side view, partly sectioned, of another partial grip of the present invention having the head cap in FIG. *5*[4].

In order to enhance the fastening of the head cap 30 with the head end of the handle 20, the head cap 30 may be provided with a plurality of protrusions 31 each having a retaining head 32 which is greater in diameter than the protrusions 31, as shown in FIG. 5 and FIG. 7. The head cap 30 is thus securely attached to the handle 20, best shown in FIGS. 5 and 7. Now referring to FIG. 4, and FIG. 6, in another embodiment of the invention, the head cap 30 is provided with a plurality of threaded holes 35 and bolts 33 which are engaged with the threaded holes 35. Each bolt 33 has a head 34 which provides a similar function the retaining head 32 of FIG. 5. The head cap 30 is thus securely fastened with the handle 20, thanks to the protrusions 31 or the bolts 33 which are securely anchored in the head end of the handle 20. The head cap 30 of the present invention is not vulnerable to being separated from the head end of the handle 20 even if the head cap 30 is used to hit a nail or screw that is not completely fastened onto something.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following appended claims.

What is claimed is:

1. A hand tool comprising a blade, a handle, and a head cap, said blade being fastened with a first end of said handle, said handle having a head end opposite to said first end, said head cap being fastened with said head end; wherein said handle and said head cap are made integrally of a plastic material by injection molding; and wherein said head cap has a plurality of protrusions each having a retaining head, said protrusions being anchored in said head end of said handle.

2. A hand tool comprising a blade, a handle, and a head cap, said blade being fastened with a first end of said handle, said handle having a head end opposite to said first end, said head cap being fastened with said head end; wherein said head cap is provided with a plurality of threaded holes and bolts which are engaged with said threaded holes; wherein said head cap and said handle are made integrally of a plastic material by injection molding; and wherein said bolts are anchored in said head end of said handle.

3. The hand tool as defined in claim 1, wherein said handle is provided with a skidproof area at an outer surface of said handle to provide friction between said handle and a hand holding said handle.

4. The hand tool as defined in claim 2, wherein said handle is provided with a skidproof area at an outer surface of said handle to provide friction between said handle and a hand holding said handle.

*5. A hand tool comprising, in combination: a handle having a first end and a second end; a blade attached to the first end of the handle; and a head cap fastened with the second end of the handle, the handle being made of a plastic material, the handle and the head cap being made integral by injection molding, and the head cap having at least one*

*protrusion anchored in the second end of the handle, wherein said at least one protrusion includes a retaining head.*

*6. The hand tool as defined in claim 5, wherein the handle and the head cap are made integrally of a plastic material by injection molding.*

*7. The hand tool as defined in claim 5, wherein said handle is provided with a skidproof area at an outer surface of said handle to provide friction between said handle and a hand holding said handle.*

*8. A hand tool comprising, in combination: a handle having a first end and a second end; a blade attached to the first end of the handle; and a head cap fastened with the second end of the handle, the handle being made of a plastic material, the handle and the head cap being made integral by injection molding, and the head cap having at least one protrusion anchored in the second end of the handle, wherein said at least one protrusion comprises at least one bolt securely attached to the head cap, and said at least one bolt being anchored in the second end of the handle.*

*9. The hand tool as defined in claim 8, wherein the head cap includes at least one threaded hole for engaging with said at least one bolt.*

*10. The hand tool as defined in claim 8, wherein the handle and the head cap are made integrally of a plastic material by injection molding.*

*11. The hand tool as defined in claim 8, wherein said handle is provided with a skidproof area at an outer surface of said handle to provide friction between said handle and a hand holding said handle.*

* * * * *